(No Model.) 4 Sheets—Sheet 1.

E. P. MONROE.
METALLIC ROD PACKING.

No. 444,195. Patented Jan. 6, 1891.

Witnesses
Louis T. Julihn
C. P. Elwell

Inventor
Edwin P. Monroe
By Hopkins and Atkins
Attorneys (No Model.) 4 Sheets—Sheet 2.
E. P. MONROE.
METALLIC ROD PACKING.
No. 444,195. Patented Jan. 6, 1891.
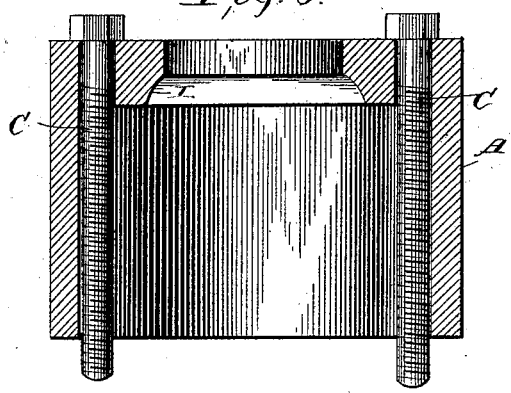
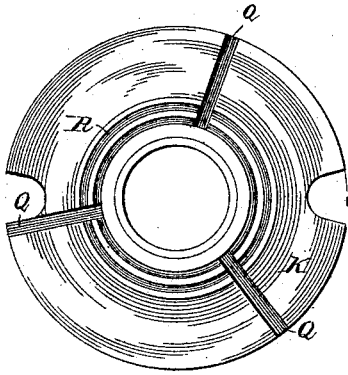
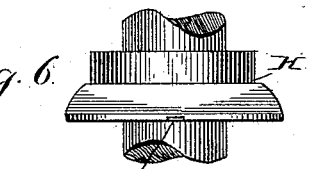
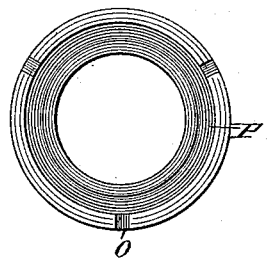
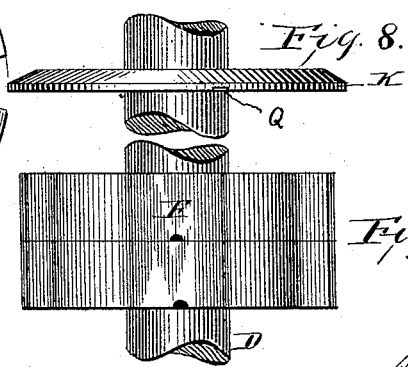
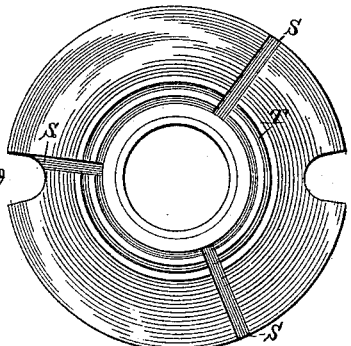
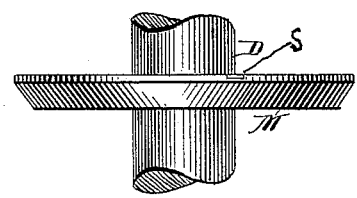
Witnesses
Louis G. Julihn
C. P. Elwell
Inventor
Edwin P. Monroe
By Hopkins & Matthias
Attorneys (No Model.) 4 Sheets—Sheet 3.
E. P. MONROE.
METALLIC ROD PACKING.

No. 444,195. Patented Jan. 6, 1891.

Witnesses

Inventor
Edwin P. Monroe.
By Hopkins and Atkins
Attorneys (No Model.)  4 Sheets—Sheet 4.

E. P. MONROE.
METALLIC ROD PACKING.

No. 444,195. Patented Jan. 6, 1891.

Witnesses

Inventor
Edwin P. Monroe.
By Hopkins and Atkins
Attorneys

UNITED STATES PATENT OFFICE.

EDWIN PEAR MONROE, OF PHILADELPHIA, PENNSYLVANIA.

METALLIC ROD-PACKING.

SPECIFICATION forming part of Letters Patent No. 444,195, dated January 6, 1891.

Application filed August 9, 1890. Serial No. 361,534. (No model.)

*To all whom it may concern:*

Be it known that I, EDWIN PEAR MONROE, of Philadelphia, in the county of Philadelphia and State of Pennsylvania, have invented certain new and useful Improvements in Metallic Rod-Packing, of which the following is a specification, reference being had to the accompanying drawings.

My improvements relate to what is known as segmental metallic rod-packing of the general character shown in United States Patent No. 112,423 and Reissue Patent No. 9,365. Such packings are self-adjusting—that is to say, adapted to move within a packing-case laterally to accommodate the lateral movements of piston-rods, &c., in motion. In such packings as heretofore made much frictional resistance has been experienced, owing to the fact that the pressure of steam has been brought to bear altogether upon one side, so that the exact fitting parts moving in contact to accommodate the changing lines of reciprocation of rods have been subjected to undue wear, and have not, under high pressures of steam, been movable with sufficient freedom. By my improved construction I admit steam upon both sides of plates and packings, so that the frictional resistance of moving parts is largely reduced by the balancing of steam-pressure upon opposite sides. I also provide for making some of the parts in sections, which is advantageous for reasons set forth below.

Figures 1, 2, 3, 4:
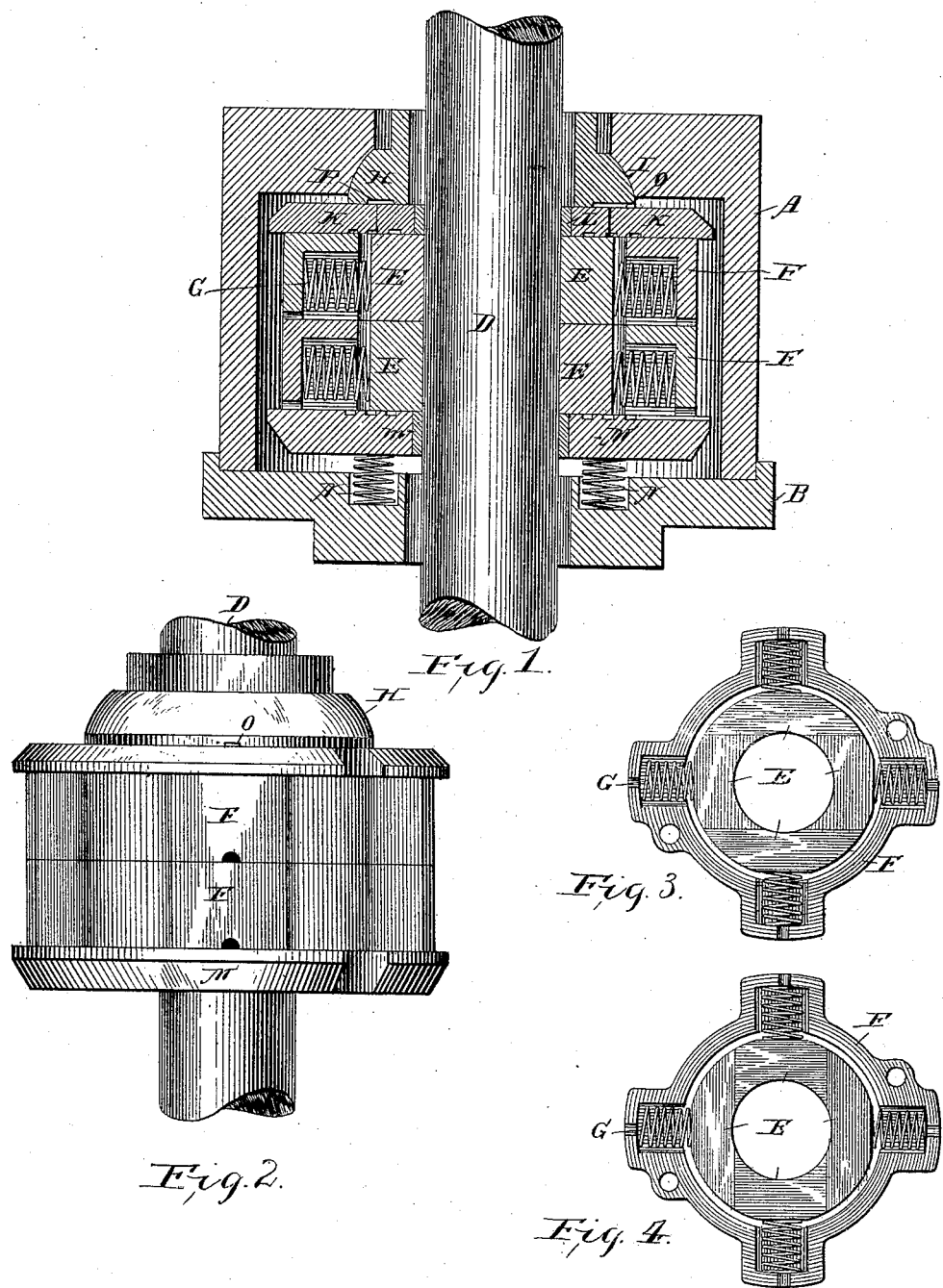
Figure 14:
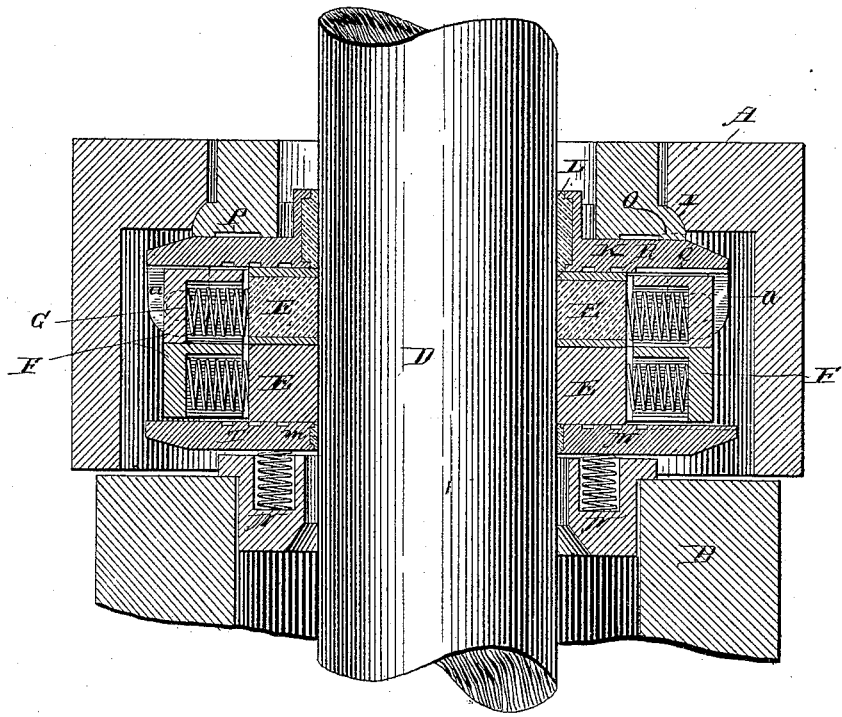
Figures 15, 16, 17:
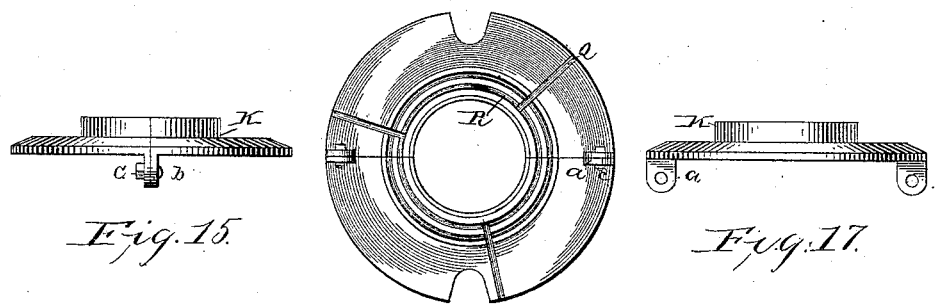
Figure 18:
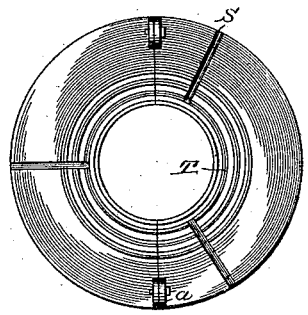
Figure 19:
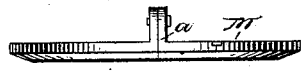
Figure 20:
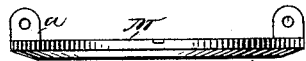
Figure 21:
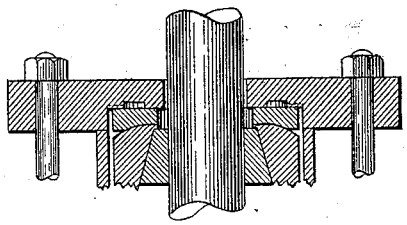

In the drawings, Figure 1 is a diametrical section of a packing-case and its packing, showing a part of a rod in elevation. Fig. 2 is a side elevation of the packing detached from its casing. Fig. 3 is a plan view of one set of segmental packings and its supporting-ring detached. Fig. 4 is a similar view showing the other set of segmental packings in position at right angles to that shown in Fig. 3. Fig. 5 is a diametrical section of the packing-case, showing bolts which secure it to its end plate. Fig. 6 is a side elevation of the annular spherical bearing-piece. Fig. 7 is a bottom plan view of the same. Fig. 8 is a side elevation, and Fig. 9 a plan view, of one face of a cap-plate for one end of the segmental packing. Fig. 10 is a side elevation of the packing-rings and a part of a rod which is shown in plan in Figs. 3 and 4. Fig. 11 is a side elevation, and Fig. 12 a plan view, of one face of another cap-plate for the packing, which I call a "follower." Fig. 13 is a diametrical section of the end plate of the casing, showing springs which are located between it and the follower, as shown in Fig. 1. Fig. 14 is a diametrical section of a packing-case and its packing, showing a part of a rod in elevation, the cap-plate and follower being respectively composed of two parts bolted together. Fig. 15 is a side elevation showing the two parts of the cap-plate bolted together. Fig. 16 is a plan view of the same. Fig. 17 is a side elevation of the cap-plate, showing the ears or lugs employed for bolting its parts together. Fig. 18 is a plan view of the follower made in two parts. Fig. 19 is a side elevation of the same, and Fig. 20 is another side elevation viewed at right angles from that shown in Fig. 19. Fig. 21 is a diametrical section of a part of a packing-case and its packing, showing a rod in elevation, the structure of the packing being different from that shown in the other figures and similar to that shown in said Reissue Patent No. 9,365.

Referring to the letters upon the drawings, A indicates the case, and B its end plate, which are secured together by the screw-bolts C. The case and the end plate are, as usual, provided with openings for a rod D, of a diameter considerably larger than that of the rod, in order to allow variation in the lines of reciprocation of the rod without bringing it in contact with the casing or its end plate.

E indicates ordinary segmental metallic packings secured in rings F and held in place by springs G. There are two sets of these packings, as usual, the construction and operation of which are well known and need not be described.

H indicates an annular bearing-piece fitted steam-tight at I to the case, so as to be capable of tilting a little in any direction in the manner of a ball-and-socket joint.

K indicates a cap-plate bearing against the bearing-piece H (see Fig. 1) on one side and against one of the packing-rings on its other side. This cap-plate is provided with an annular bushing L of Babbitt metal, which fits substantially steam-tight around the rod and reduces the friction incident to the reciprocations of the rod.

The packing-rings and their segmental metallic packings being well illustrated in Figs. 1, 3, and 4, and being of ordinary construction, I will not describe them in detail.

M indicates the follower, which bears upon one side against one of the packing-rings, and upon the other side on springs N, and is provided with a Babbitt metal bushing m.

The rod-packing case is in practice secured to a steam-chest, and steam is of course admitted into the case through its end plate. By the ordinary construction of segmental packing for rods the steam-pressure is brought to bear wholly upon one side of each of the parts whose contact with an adjacent part is intended to form a steam-tight joint, and at the same time to provide for movement of the joined parts. The result is that as the cap-plate and follower are moved by the rod laterally great friction and wear occur between the movable parts forming the steam-tight joints. To reduce this friction and wear to the minimum, I provide steam-ports between these moving parts leading to steam-chambers, whereby steam is introduced between the movable parts on the opposite side from that where it has ordinarily solely pressed. The result is that it balances part of its friction-inducing pressure, and thus reduces the friction, leaving still a sufficient preponderance of pressure to form steam-tight joints.

O in Figs. 1, 6, and 7 indicates steam-ports leading to the annular steam-chamber P in that surface of the bearing-piece H against which the cap-plate K bears.

Q, Figs. 9 and 10, indicates ports formed in a surface of the cap-plate K, leading to the annular steam-chambers R in the plate. In this instance, instead of having one large steam-chamber several small ones are provided; but that is merely a formal change.

In Figs. 11 and 12, S indicates ports in the follower, leading to annular steam-chambers T. The ports and steam-chambers in the cap-plate and follower, it will be seen, reduce the friction between those parts and the segmental packings and packing-rings by balancing steam-pressure, as above described.

By providing the ports and steam-chambers described in segmental metallic rod-packings about fifty per cent. (more or less) of the ordinary frictional resistance and resultant wear and destruction of parts can be obviated.

In Figs. 14 to 21, inclusive, is illustrated that part of my invention relating to forming some of the elements of the rod-packing in two parts, which are bolted together. The elements thus constructed are the cap-plate and the follower. These are formed each of two equal parts provided with lugs or ears a, having tapered holes through them, in which fit tapered pins b. These tapered holes and pins are made with great nicety, so that when the nuts c are screwed up the parts will be drawn together exactly to place. The reason for forming these elements in two parts is, generally stated, that of convenience and economy in renewing the packings within a case after they become worn. In practice a case for a rod-packing will usually wear much longer than the moving parts within it, because the case can be made thick enough to endure for a long period without being too large or cumbrous; but the moving parts within the case will ultimately become worn, so as to need replacing, especially when used to pack rods having very extensive reciprocating and vibratory motion—as, for example, in large marine engines.

By making the elements described in two equal parts they can be removed and replaced by new ones without detaching the rod from its cross-head at one end or from its piston at the other, which is a great saving.

What I claim is—

1. In a metallic rod-packing, the combination, with a main casing and the movable parts adapted to accommodate the lateral movements of the rod, joined steam-tight and subject to steam-pressure, and ports and chambers arranged between these movable parts, as shown, so as to counterbalance the steam-pressure, substantially as set forth.

2. In a metallic rod-packing, the combination, with the cap-plate K and the follower M, each made in two parts bolted together, and the rod D, of the Babbitt-metal bushings L and m, substantially as set forth.

3. In a metallic rod-packing, the combination, with the rod and packing-rings, of a cap-plate made in two parts bolted together, and a follower made in two parts and bolted together with tapering pins and adapted to move laterally with the rod, substantially as set forth.

4. In a metallic rod-packing, the combination of the casing and the packing contained within the casing, and a plate through which the rod passes, composed of separable parts united together by tapering pins and adapted to move laterally with the rod, substantially as set forth.

In testimony of all which I have hereunto subscribed my name.

EDWIN PEAR MONROE.

Witnesses:
THOS. S. HOPKINS,
C. P. ELWELL.